US007827575B2

(12) United States Patent
Miyamoto et al.

(10) Patent No.: US 7,827,575 B2
(45) Date of Patent: Nov. 2, 2010

(54) TV APPARATUS, ITS CONTROL METHOD, NETWORK TV SYSTEM AND COMPUTER PROGRAM

(75) Inventors: Katsuhiro Miyamoto, Kanagawa (JP); Shuntaro Aratani, Tokyo (JP); Kazumi Suga, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1138 days.

(21) Appl. No.: 10/939,509

(22) Filed: Sep. 14, 2004

(65) Prior Publication Data
US 2005/0071870 A1 Mar. 31, 2005

(30) Foreign Application Priority Data
Sep. 30, 2003 (JP) ............................ 2003-342513

(51) Int. Cl.
H04N 7/16 (2006.01)
H04N 4/445 (2006.01)
(52) U.S. Cl. ......................... 725/47; 725/37; 725/139
(58) Field of Classification Search .................. 725/47, 725/37, 139
See application file for complete search history.

(56) References Cited

U.S. PATENT DOCUMENTS

| RE34,895 E * | 4/1995 | Morotomi et al. ........... 348/156 |
| 6,684,110 B1 | 1/2004 | Kutsuna et al. .............. 700/17 |
| 6,853,728 B1 * | 2/2005 | Kahn et al. ................ 380/239 |
| 7,054,959 B2 * | 5/2006 | Saito et al. ................ 710/33 |
| 2003/0078966 A1 | 4/2003 | Kinjo |
| 2003/0149988 A1 * | 8/2003 | Ellis et al. ................ 725/87 |
| 2003/0204660 A1 | 10/2003 | Saito et al. ................ 710/305 |
| 2004/0068752 A1 * | 4/2004 | Parker ................... 725/120 |
| 2005/0028208 A1 * | 2/2005 | Ellis et al. ................ 725/58 |
| 2008/0273079 A1 * | 11/2008 | Campbell et al. .......... 348/14.08 |

FOREIGN PATENT DOCUMENTS

| JP | 9-322085 | 12/1997 |
| JP | 2002-290350 A | 10/2002 |
| JP | 2003-195845 A | 7/2003 |

OTHER PUBLICATIONS

TA Document 1998016: "AV/C Compatible Asynchronous Serial Bus Connections, Version 1.0, Jan. 26, 1999".

* cited by examiner

*Primary Examiner*—Joseph P Hirl
*Assistant Examiner*—Jivka Raboviansky
(74) *Attorney, Agent, or Firm*—Fitzpatrick, Cella, Harper & Scinto

(57) ABSTRACT

Even when a user leaves from a TV apparatus or enjoys audio-visual contents by another reached TV apparatus, the user can enjoy the left audio-visual contents without being embarrassed in operating the reached TV apparatus. A configuration is set up by having leaving information detection means for detecting the leaving information form the user, storage means for storing the image data after detecting the leaving information, and transmission means for transmitting said image data to the reached TV apparatus of the user so that the user is allowed to enjoy the left audio-visual contents and the like in the left TV apparatus by the reached TV apparatus.

6 Claims, 15 Drawing Sheets

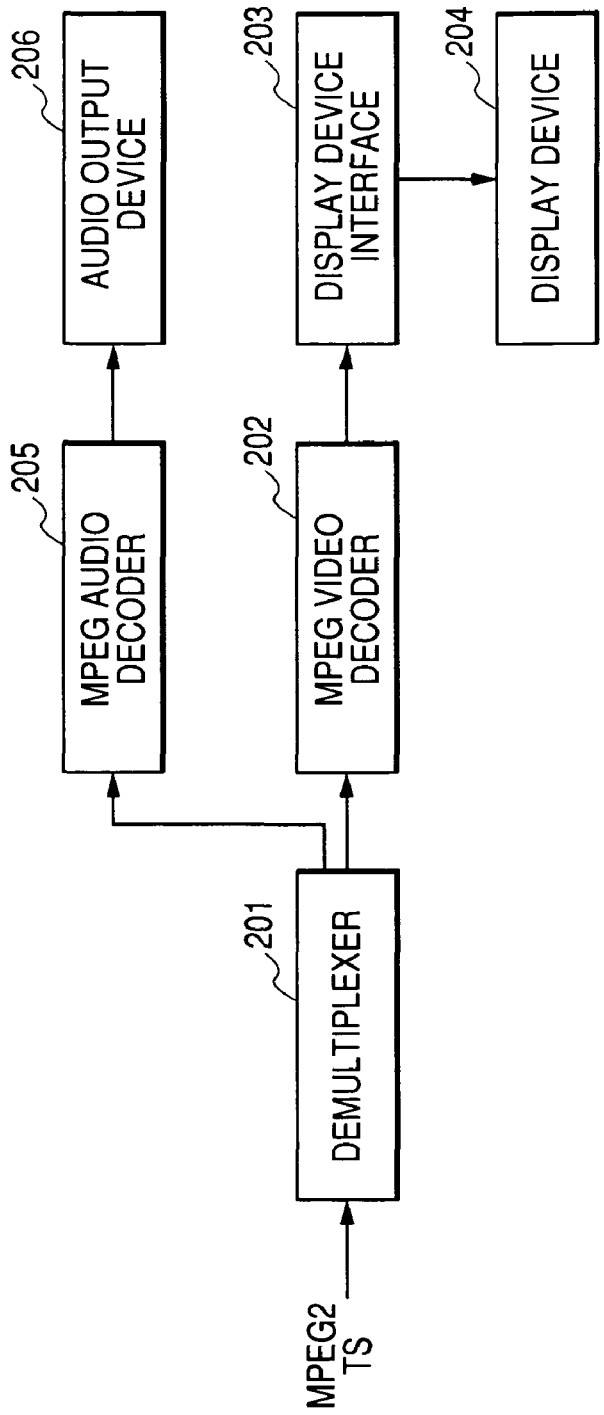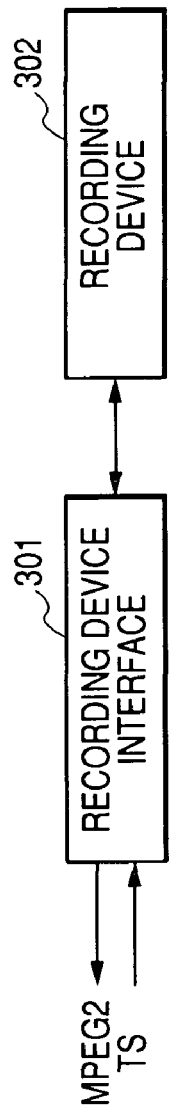

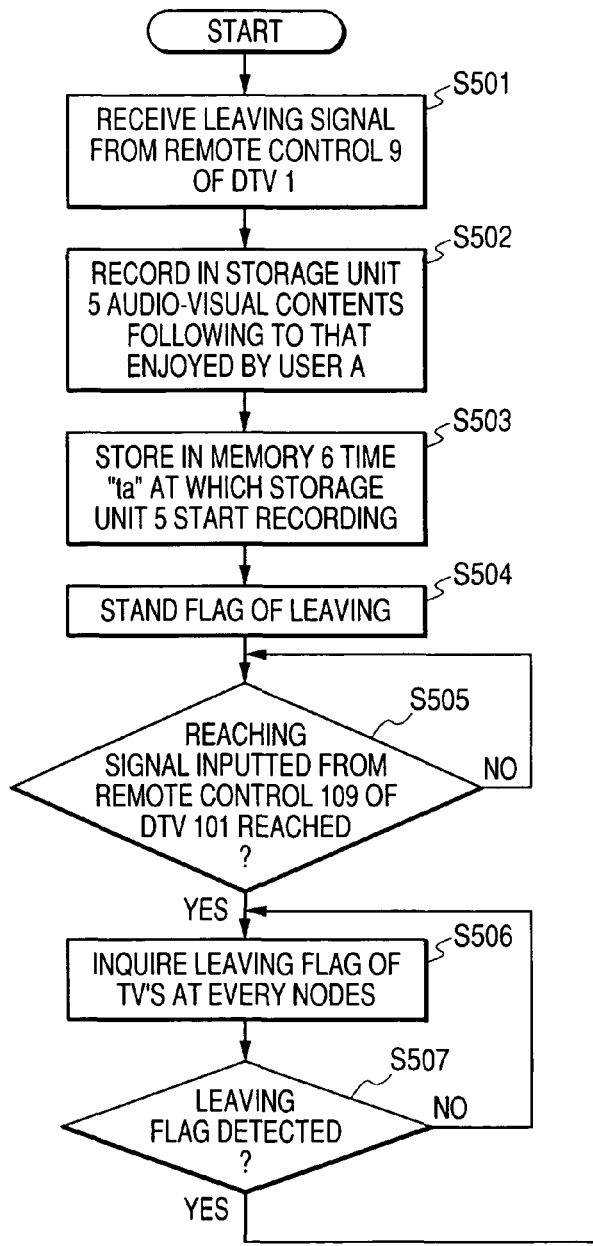
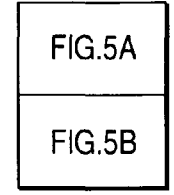
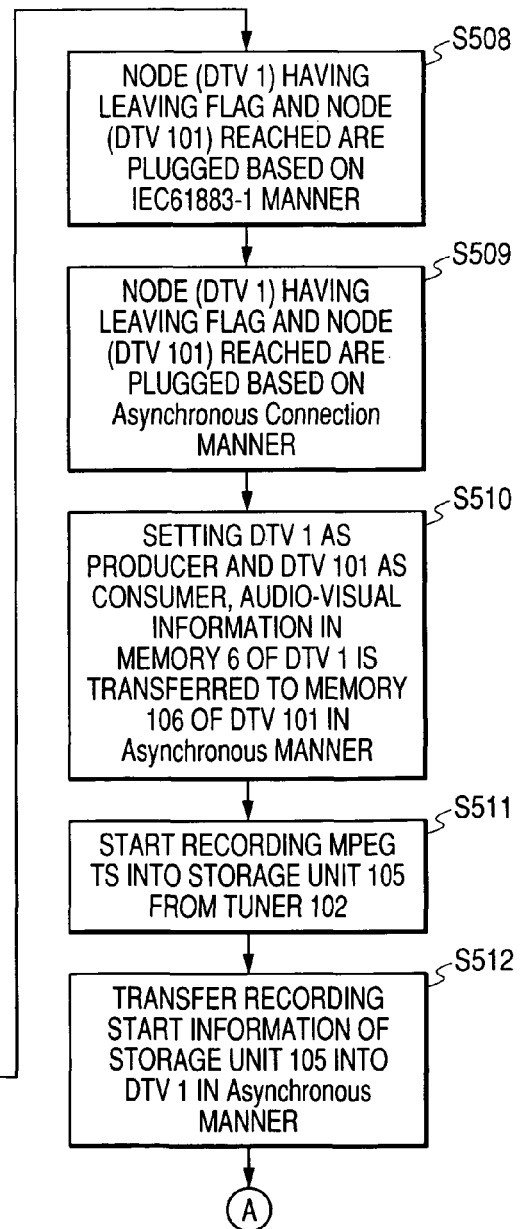
FIG. 5
FIG. 5A

TV APPARATUS, ITS CONTROL METHOD, NETWORK TV SYSTEM AND COMPUTER PROGRAM

BACKGROUND OF THE INVENTION

1. Field of the Invention

The present invention relates to a TV apparatus, its control method, a network TV system, a computer program and a recording medium readable by a computer, and more in particular, it relates to a display of an image and the like using IEEE1394.

2. Related Background Art

In recent years, not only offices, but also various associations have begun taking an active role to realize a home network. As one example, the IEEE has been promoting the standardization of a technology for transferring serial data at high speed for a long distance (IEEE1394.b). Besides, VESA (Video Electronics Standards Association) has undertaken a study of a communication protocol based on the IEEE1394b. in Home_Networking Committee.

Moreover, the 1394TA (Trade Association) is right in the midst of formulating a communication protocol based on the IEEE1394-1995 and its expanded regulation (IEEE1394.a-2000 regulation and the like).

On the other hand, the practical application of a digital TV has been carried out with Europe as a center. This digital TV digitally packets an image, an audio data and the like, and has a capability of simultaneously transferring a plurality of programs at the same bandwidth as the broadcast bandwidth of the conventional analog TV. In addition, because of the digitalization of the image and the audio (packet), random access to that data is easily accomplished, and therefore, there is a merit of being able to simultaneously store and reproduce or easily edit and transfer the data. For example, the digitally packeted image and audio data are directly recorded on the storage medium randomly accessible such as a hard disc and a semiconductor, and while that data is being reproduced, it is possible to perform a control for recording another data on a position of another recording medium.

By utilizing the above-described merit, if the digital TV has a built-in recording medium which is randomly accessible, a new function can be realized. For example, heretofore, in case of leaving while enjoying a program, the data broadcast while leaving has not been enjoyed, but if the recording medium which is randomly accessible is used, the data during leaving is recorded on the recording medium, and upon return from leaving, the left data is reproduced from the recording medium, and moreover, even during reproducing, the data can be continuously recorded on the recording medium, and therefore, the user can enjoy the TV without missing the data in the state where the broadcast content is delayed. As one example of this technology, Japanese Patent Application Laid-Open No. H09-322085 can be cited.

However, according to the above-described Japanese Patent Application Laid-Open No. H09-322085, when the user who left the digital TV returns and enjoys the digital TV again, though it is possible for him to enjoy the left image and the like, in order to enjoy the left image and the like, he has to enjoy by the left digital TV. That is, when the user leaves the digital TV, he is unable to enjoy the left image and the like by another digital TV reached (by the user). This has prevented the user from comfortably enjoying the TV.

Further, when a plurality of users simultaneously use an apparatus storing the image data and the storage apparatus of a server, there develops a problem in the bandwidth of a network. Particularly, in an IEEE1394 home network, when a transfer of 100 m or more is performed, its bandwidth ends up dropping to the level of 100 Mbps. Hence, a storage control method to reduce a data transfer preferably on the network is required by providing a receiving function and a storing function in each digital TV. What is meant by the IEEE1394 home network is a home network configured from an apparatus conforming to an IEEE1394-1995 regulation and its expanded regulation (IEEE1394.a-2000 regulation and the like).

Further, in the digital TV, not only the image and audio data, but also, for example, the audio and visual information such as helping enjoy the information and the like on an agent function for executing the selection of favorite programs from many channels realized by the information on the channels frequently enjoyed or the digitalization of the TV are different from the left information, and therefore, the user is confused in operating a reached digital TV.

The present invention has been carried out in view of the above described problem, and the object of the invention is to provide a TV apparatus, its control method, a network TV system, a computer program and a recording medium readable by a computer, which enables the user to enjoy the image and the like after he left without being embarrassed in operating the reached TV apparatus even in the case where the user leaves the TV apparatus and enjoys audio-visual contents by another reached TV apparatus.

SUMMARY OF THE INVENTION

The TV apparatus of the present invention has a leaving information receiving unit for receiving leaving information from a user, a storage unit for storing an image data after the leaving information is detected, and a transmitting unit for transmitting a stored image data to the reached TV apparatus of the user.

Further, another mode in the TV apparatus of the present invention has a reaching information receiving unit for receiving reaching information from the user, a receiving unit for receiving a left image data from the reached TV of the user after having received the reaching information, and a display unit for displaying the image data received by the receiving unit.

Further, the TV apparatus of the present invention has a leaving information unit and reaching information receiving unit for receiving the leaving information and the reaching information, respectively from the user, a storage unit for storing the image data, a transmitting unit for transmitting the image data to the reached TV or the left TV, and a receiving unit for receiving the image data from the reached TV apparatus or the left TV apparatus, and a display unit for displaying the image data received at the receiving unit.

The network TV system of the present invention has the left TV apparatus, the reached TV apparatus, and the like, and the left TV apparatus and the reached TV apparatus are connected by the network.

The computer program of the present invention is a computer program for allowing the computer to perform a processing in the TV apparatus, and has a leaving information detection processing for detecting the leaving information from the user, a storage processing for storing the image data after having detected the leaving information, and a transmitting processing for transmitting the image data to the reached TV apparatus of the user.

Further, another mode in the computer program of the present invention is a computer program for allowing the computer to perform a processing in the TV apparatus, and has a reaching information detection processing for detecting the reaching information from the user, a receiving processing for receiving a left image data from the left TV receiver from the user from the user after having detected the reaching information, and a display unit for displaying the image data received by the receiving unit. Further, the present invention includes a recording medium storing these computer programs.

According to the present invention, even when the user leaves the TV apparatus and performs the enjoyment of audio-visual contents by another reached TV, it is possible for him to enjoy a left image data and the like arising from a delay. Further, since a control is set up in such a manner as to store channel information for selecting the channel information enjoyed in the past by a user or the favorite programs of the user and to control these channel information, the user can enjoy the audio-visual contents without being embarrassed in operating the reached TV apparatus.

BRIEF DESCRIPTION OF THE DRAWINGS

FIG. 2 is a schematic block diagram of a display unit;

FIG. 3 is a schematic block diagram of a storage unit;

DETAILED DESCRIPTION OF THE PREFERRED EMBODIMENTS

Figure 1:
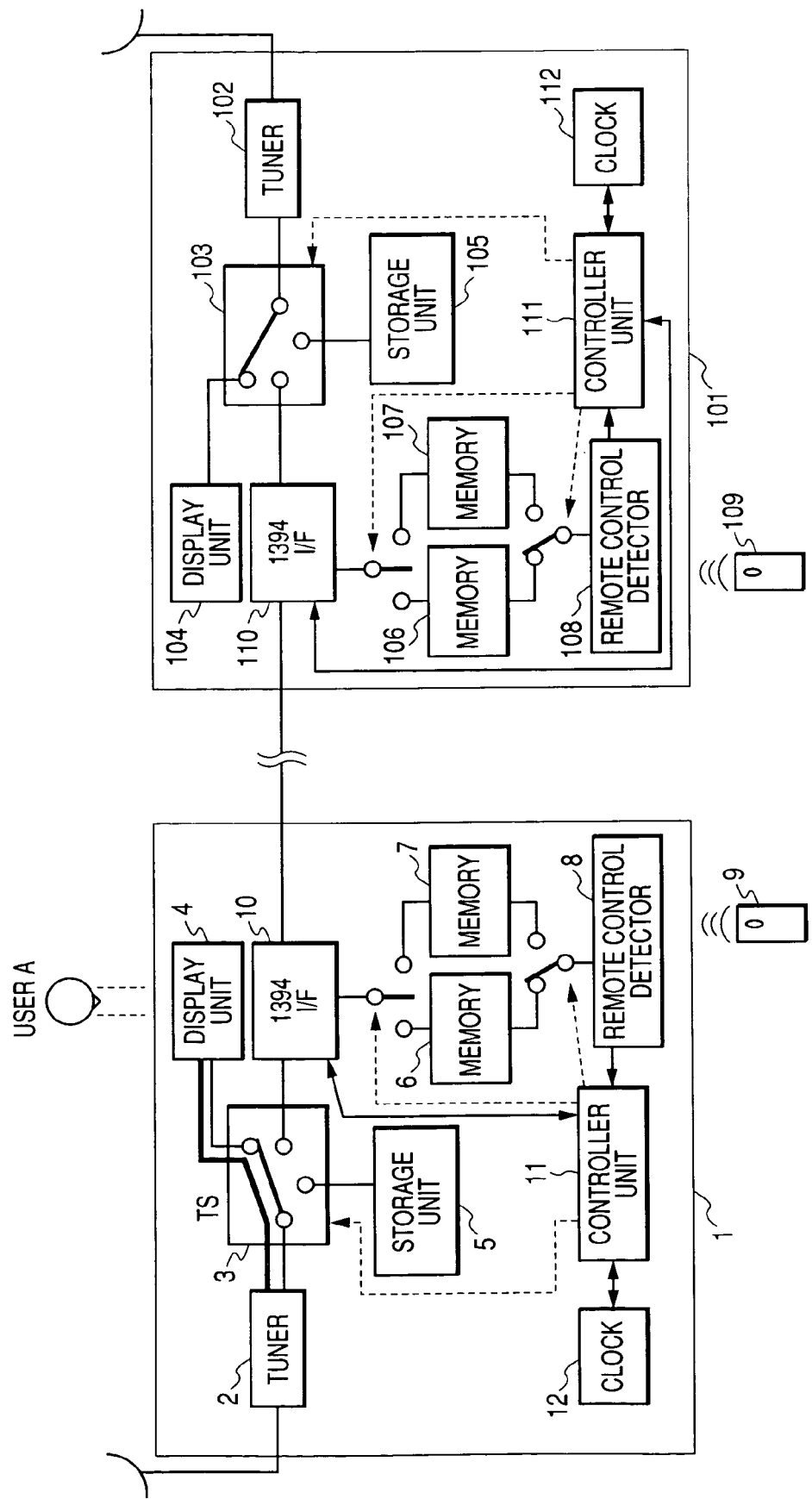
FIG. 1 is a schematic block diagram of a network TV system in the embodiment of the present invention.

FIG. 1 is a schematic block diagram of a network TV system in the embodiment of the present invention.

The network TV system of the present embodiment shown in FIG. 1 shows an example in which two AV devices (reference numerals 1 and 101 in the drawing) are connected on the network.

Further, while the network TV system of the present embodiment is a system using the IEEE1394-1995 regulation and its expanded regulation (IEEE1394. a-2000 and the like), the present invention is not limited to this, but is effective if it is a network capable of changing a data transfer speed between nodes and guaranteeing a transfer time zone. Further, the AV device may be a plurality of not less than three sets.

Description of Each Component Unit

Each component unit of the network TV system shown in FIG. 1 will be described.

The network TV system of the present embodiment is configured by including a left digital TV apparatus 1 (hereinafter referred to as digital TV1) used by a user A, and a reached digital TV apparatus 101 (hereinafter referred to as digital TV101) to which the user A has moved by leaving the digital TV1.

A tuner unit 2 receives a digital broadcast, and performs a selection of the digital broadcast, a conversion of A/D, a desired correction of error, and the like. A selector switch unit 3 is for sending an MPEG2_TS (Transport Stream) outputted from the tuner 2 and the data outputted from a storage unit 5 to a display unit 4 and a storage unit 5 or a 1394I/F unit 10. The 1394I/F unit 10 conforms to the IEEE1394-1995 regulation or its expanded regulation (IEEE1394.a-2000 regulation and the like). Here, the MPEG2_TS is a digital data bit stream where a plurality of images, sounds and data are packeted (188 bit unit) and superimposed.

FIG. 2 is a schematic block diagram of a display unit 4.

As shown in FIG. 2, the display unit 4 is configured by including a demultiplexer 201 separating the MPEG2_TS data into image and audio data and the like, an MPEG video decoder 202, an MPEG audio decoder 205, an audio output device 206, a display device interface 203, and a display device 204.

The storage unit 5 is a unit for temporarily storing the MPEG2_TS data. In FIG. 3 is shown a schematic block diagram of the storage unit 5.

As shown in FIG. 3, the storage unit 5 is configured by including a recording device interface 301 for storing and a recording device 302. This storage unit 5 has a function to independently and simultaneously perform the input and output of the MPEG2_TS data, and can read the MPEG2_TS data recorded previously while writing in the recording device 302. Further, this recording device 302 may be a hard disc drive, DVD or a semiconductor memory.

The memories 6 and 7 are for storing channel selection information which the user enjoyed in the past and the above-described audio-visual information such as a channel data to call out a favorite channel. In the memories 6 and 7 is inputted and stored the channel information selected by the user from a remote controller 9 through a remote controller detection portion 8. Switch means is provided such that the storing of the channel information selected by the user from the remote controller 9 is performed for either one of the memories 6 and 7.

Figure 4:
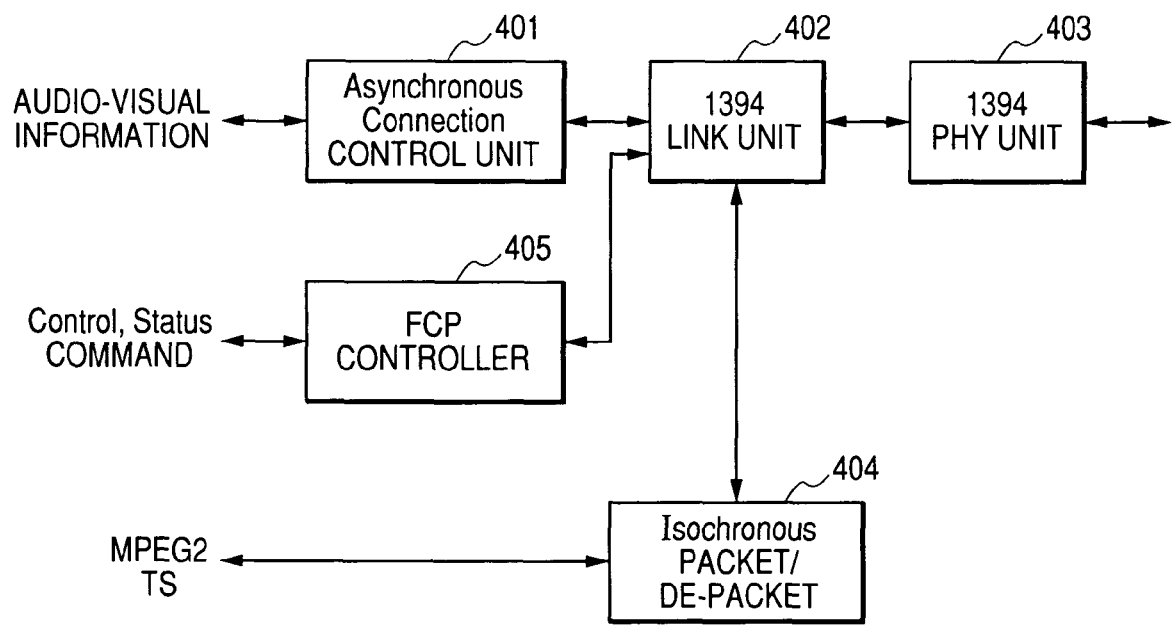
FIG. 4 is a schematic block diagram of a 1394I/F unit.

The 1394I/F unit 10 has means (reference numeral 404 of FIG. 4) for packeting the data of the MPEG2_TS according to the protocol set up by an IEC 61883-1, 4 and transferring it to another AV device, and at the same time, has means (reference numeral 401 of FIG. 4) for transferring each audio-visual information of the memories 6 and 7 according to an Asynchronous Connection protocol (Reference Literature: TA Document 1998016, AV/C Compatible Asynchronous Serial Bus Connections) formulated by a 1394TA. In FIG. 4 is shown a schematic block diagram of the 1394I/F unit 10.

The control unit 11 performs a switch control in the interior of the digital TV1 by the leaving information and the reaching information detected by the remote controller detection unit 8, and in addition, performs a data storage and the control of a time, a leaving flag and the like. Further, the control unit 11 has also TV apparatus detection means for detecting another reached digital TV101 of the user. A clock 12 is for measuring the time and the like to start a storing in the storage unit 5.

While each component unit of the digital TV 1 has been described as above, the same holds true with the digital TV101, and, to be more precise, each configuration of reference numerals 2 to 12 in the digital TV1 is equivalent to that of reference numerals 102 to 112 in the digital TV101, respectively.

(1) In the case where the user leaves without any reaching destination determined.

Figure 5B:
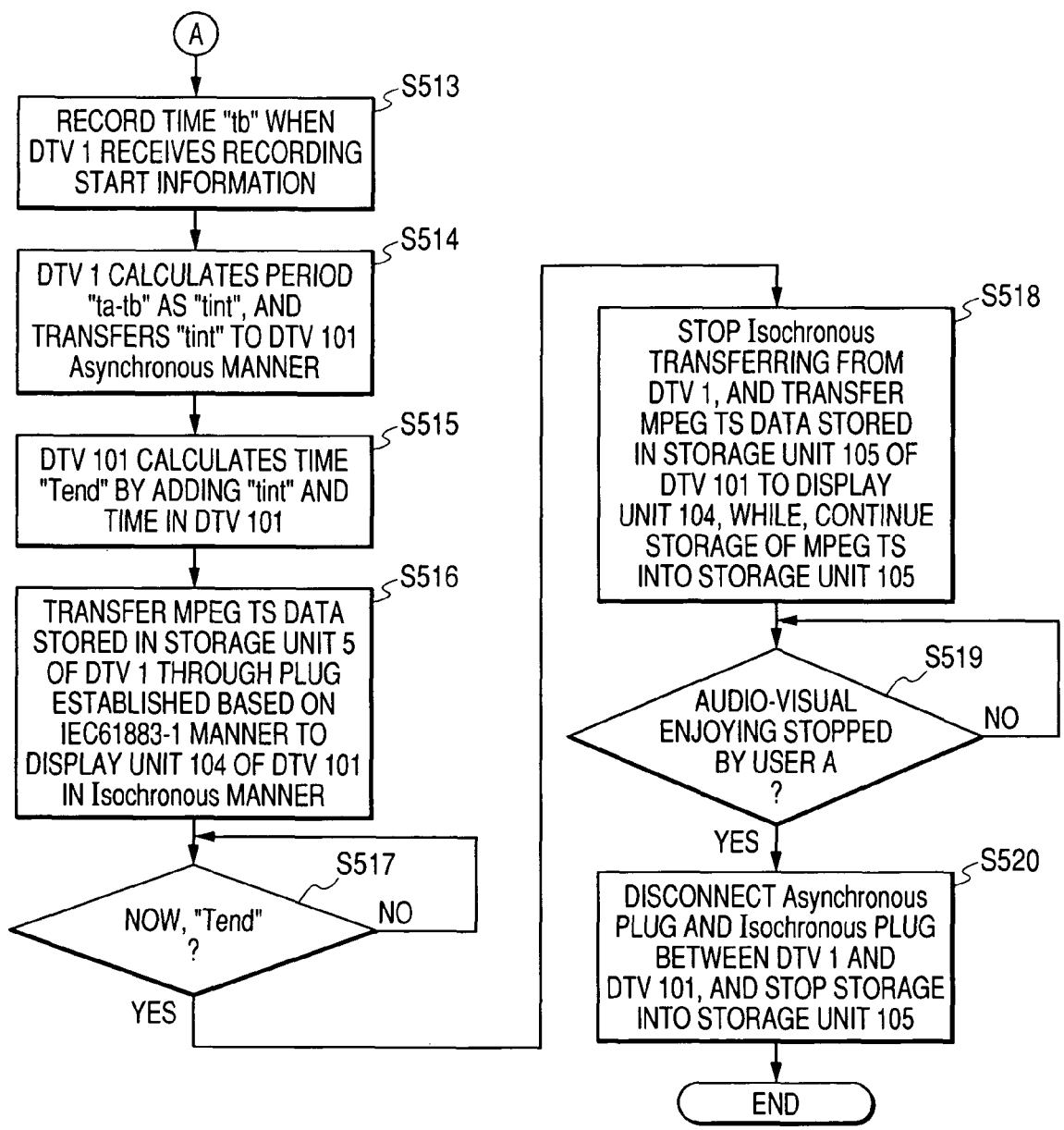
FIG. 5 is comprised of FIGS. 5A and 5B are flowcharts to explain about a first control system of a network TV system in the present embodiment.

FIGS. 5A and 5B are flowcharts to explain about a first control method of the network TV system in the present embodiment. In the first control method, a control method in case of the user having left without any reaching destination determined will be described.

FIG. 1 is a view to show a state where a user A is enjoying the audio-visual contents by the digital TV1, and this user A allows the display unit 4 to select and display a desired image data, audio data and the like from the MPEG2_TS data to be received by the tuner 2. At this time, the audio-visual information is stored in the memory 6.

Figure 6:
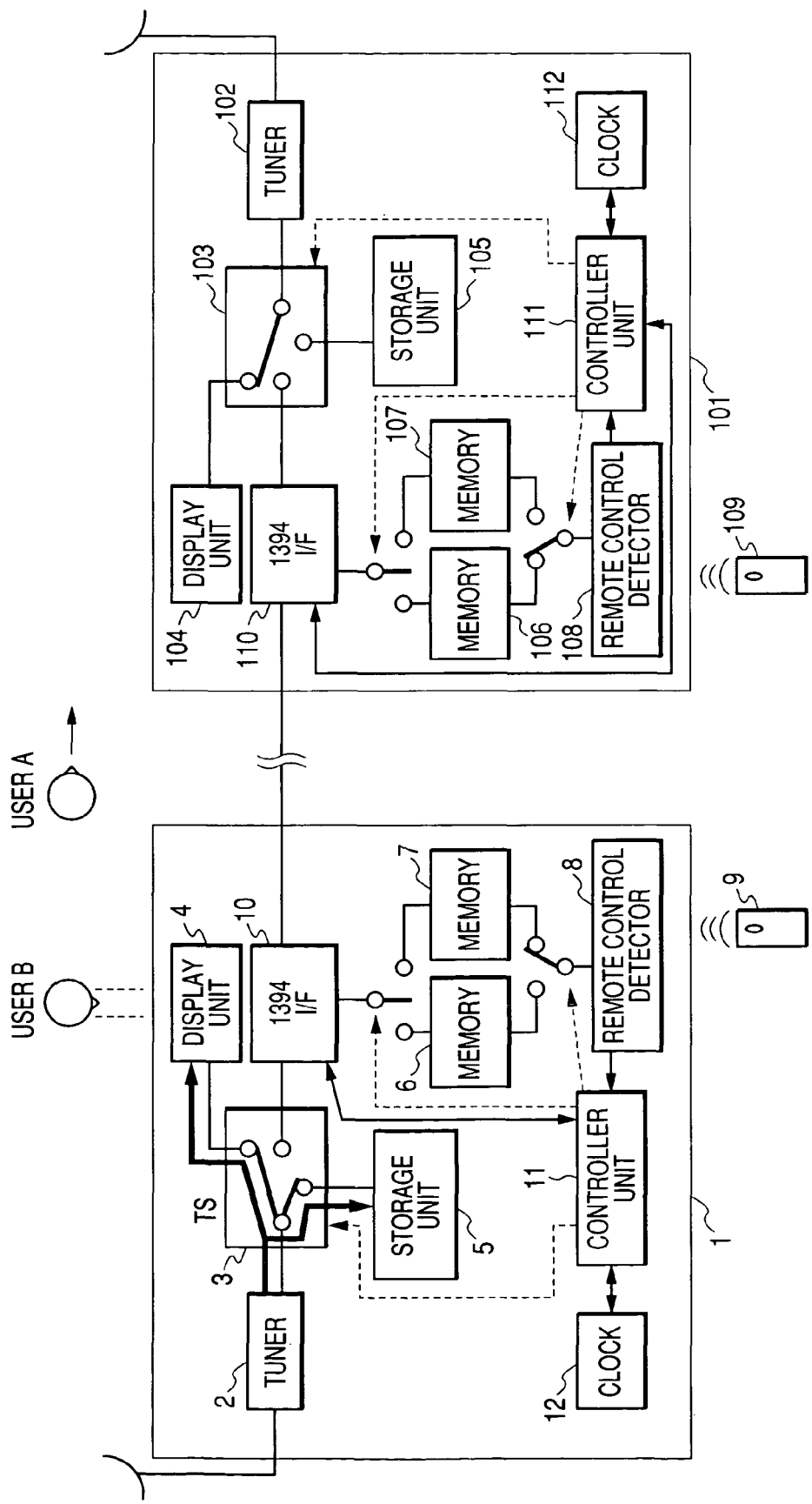
FIG. 6 is a schematic block diagram to explain about an operation of a network TV system in the first control method.

First, when the user A has to leave for some reasons, the user A notifies the digital TV1 of leaving information through the remote controller 9 (step S501). At this time, the leaving information of the user A may be configured such that, in addition to the notification by the remote controller, the image of enjoying position is taken by, for example, a TV camera mounted on the digital TV1, and the digital TV1 recognizes that the image of the user A disappears and automatically receives the leaving information. Subsequently, in the control unit 11, when the leaving information (no reaching destination determined) is received from the remote controller detection unit 8, as shown in FIG. 6, the selector switch unit 3 is operated to be connected to the storage unit 5 side so that the sequence of the audio-visual contents enjoyed by the user A is stored in the storage unit 5 (step S502). Here, the MPEG2_TS is stored in the storage unit 5 as described above, and at the same time, another user B selects a desired audio-visual data and allows it to be displayed on the display unit 4 to be enjoyed.

Further, as shown in FIG. 6, a switch for storing the audio-visual information is changed over to the side of the memory 7. The user B is allowed to receive the support of a channel selection based on new audio-visual information. At this time, the audio-visual information for the user B may be downloaded from another AV device through the 1394I/F unit 10 or the audio-visual information for the user A stored in the memory 6 may be copied in the memory 7 and used.

Subsequently, in the control unit 11, a time [ta] when the storing is started in the storage unit 5 is measured by the clock 12, and that time information is stored in the memory 6 (step S503). Subsequently, in the control unit 11, a flag to show the leaving origin is stood up (step S504). This flag and time information can be read by a status command inputted through the 1394I/F unit 10.

Subsequently, the user A decides a reaching destination, and it is determined whether or not a reaching signal input from a remote controller 109 of the reached digital TV 101 is available (step S505). This determination is performed by the control unit 111, and as a result of this determination, when it is determined that the reaching signal input from the remote controller 109 of the reached digital TV 101 is available, the procedure advances to step S506. On the other hand, as a result of the determination of step S505, when it is determined that the reaching signal input from the remote controller 109 of the reached digital TV101 is not available, a standby is effected at step S505 until the reaching signal input becomes available. At this time, the reaching information of the user A may be configured such that, in addition to the notification by the operation of the remote controller, the image of enjoying position is taken by, for example, a TV camera mounted on the digital TV101, and the digital TV101 recognizes that the image of the user A is taken and automatically obtains the reaching information.

Subsequently, in a control unit 111 of the reached digital TV101, in order to search for the left source, the leaving flag transfers a status command, which comes back as a response, to all the nodes on the IEEE1394 network in order or in broadcast by the Asynchronous transfer of the IEEE1394 (step S506).

Subsequently, in the control unit 111, it is determined whether or not the leaving flag is found (step S507). As a result of this determination, when the leaving flag is found, the procedure advances to step S508. On the other hand, as a result of the determination of step S507, when the leaving flag is not found, the procedure returns to step S506.

Subsequently, an Isochronous plug is plugged based on the IEC61883-1 specification for the returned node (digital TV101) wherein the leaving flag returns within response information for the status command (step S508). Subsequently, an Asynchronous plug is plugged for the node (digital TV1) having the leaving flag based on an Asynchronous Connection specification set up by the 1394TA (step S509). This allows, in the present embodiment, both of the plugs to be plugged by the node between the digital TV1 and the digital TV101.

Subsequently, by using an Asynchronous Connection control unit 401 in the interior of the 1394I/F unit 10 shown in FIG. 4, the reaching audio-visual information of the memory 6 is transferred to a memory 106 in the interior of the digital TV101 (step S510).

Subsequently, the digital TV101 starts storing the MPEG2 TS from the tuner 102 in a storage unit 105 (step S511).

Figure 7:
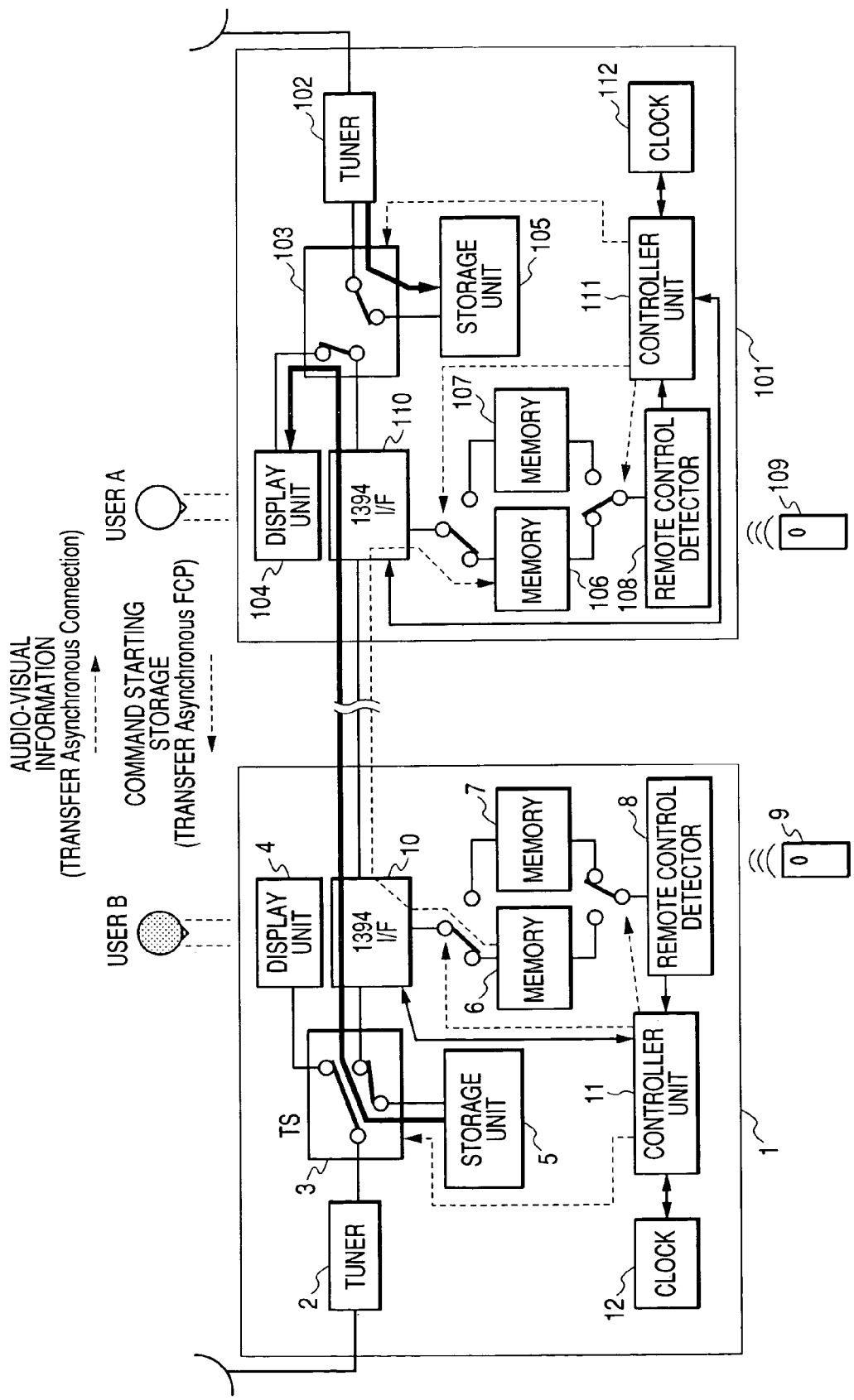
FIG. 7 is a schematic block diagram to explain about the operation of the network TV system in the first control method.

Subsequently, this recording start information is transferred in an Asynchronous manner by a control command through the IEEE1394 in the form suitable for a FCP (Function_Control_Protocol) command frame set up by the IEC61883-1 (step S512). The operational state in this case is shown in FIG. 7.

Subsequently, in the digital TV1, a record time [tb] when the control command of the above described recording start information is received is recorded in the interior of the control unit 11 (step S513). Subsequently, in the control unit 11, a time differential [tint] between the record time [tb] and the record time [ta] is calculated, and a value [tint] of the time differential calculated is transferred in the Asynchronous manner to the digital TV101 as a response to the above-described control command through the IEEE1394 in the form suitable for the FCP command frame (step S514).

Subsequently, the digital TV101, in the control unit 111, adds up the time differential [tint] transferred from the digital TV1 and the time of the clock 112, and takes that time as [tend] (step S515). Here, supposing that a transfer error and the like occur in the process between step S511 to step S515 and a tlimit (ms} or more has passed in the process between step S511 to step S515, the processing has to be recommenced from step S511. This tlimit can be varied by the 1394I/F units (reference numerals 10 and 110).

Subsequently, the digital TV1 stops storage into the storage unit 5 from the tuner 2, and also transfers the MPEG2_TS data stored in the storage unit 5 to a display unit 104 by using an Isochronous plug (based on the IEC61883-1 specification) which plugs between the digital TV1 and the digital TV101 (step S516). This transfer is continued till the time [tend] is reached.

Subsequently, it is determined whether or not the time [tend] has come (step S517). As a result of this determination, when it is determined that the time [tend] has come, the procedure advances to step S518. On the other hand, as a result of the determination of step S517, it is determined that the time [tend] has not come, a standby is effected at step S519 until the time [tend] comes.

Figure 8:
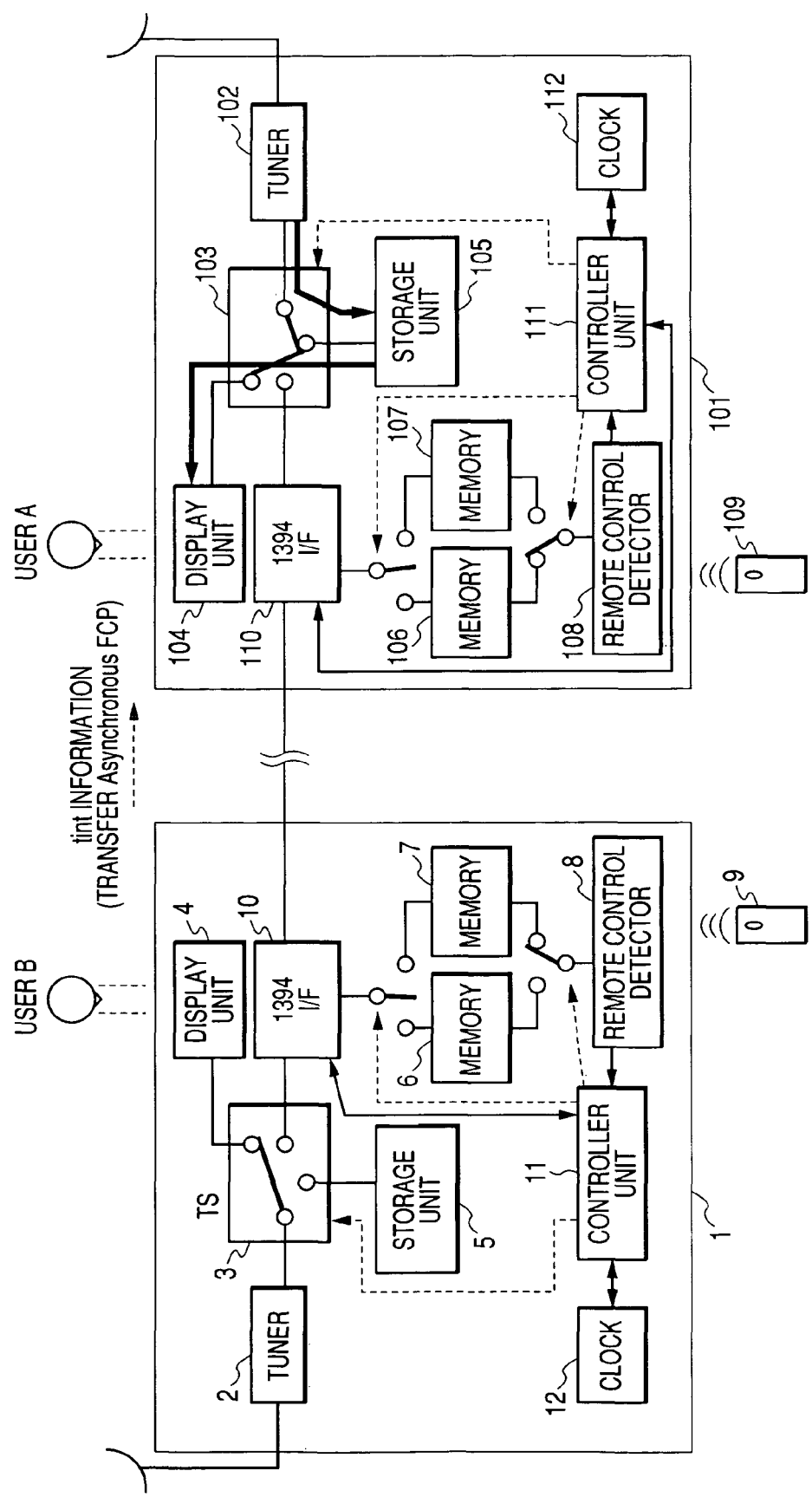
FIG. 8 is a schematic block diagram to explain about the operation of the network TV system in the first control method.

Subsequently, after the time [tend] has come, the data transfer from the storage unit 5 is stopped, and the MPEG2_TS data stored subsequent to the time tb (time by the digital TV1) is transferred to the display unit 104 from a storage unit 105 (step S518). At this time, the writing (storage) of the MPEG2_TS data performed for the storage unit 105 is allowed to continue. The operational state in this case is shown in FIG. 8.

Subsequently, it is determined whether or not the user A stops the audio-visual enjoyment of the contents (step S519). As a result of this determination, when it is determined that the user A stops the audio-visual enjoyment, the procedure advances to step S520. On the other hand, as a result of the determination of step S519, when it is determined that the user A does not stop the audio-visual enjoyment, a standby is effected at step S519 until it is determined that the user A stops the audio-visual enjoyment.

Subsequently, when it is determined that the user A stops the audio-visual enjoyment, the storage into the storage unit 105 is stopped, and the plug plugged between the digital TV1 and the digital TV101 is disconnected (step S520).

(2) In the case where no storage unit exists in a reaching destination when the user leaves without any reaching destination determined.

Figure 9:
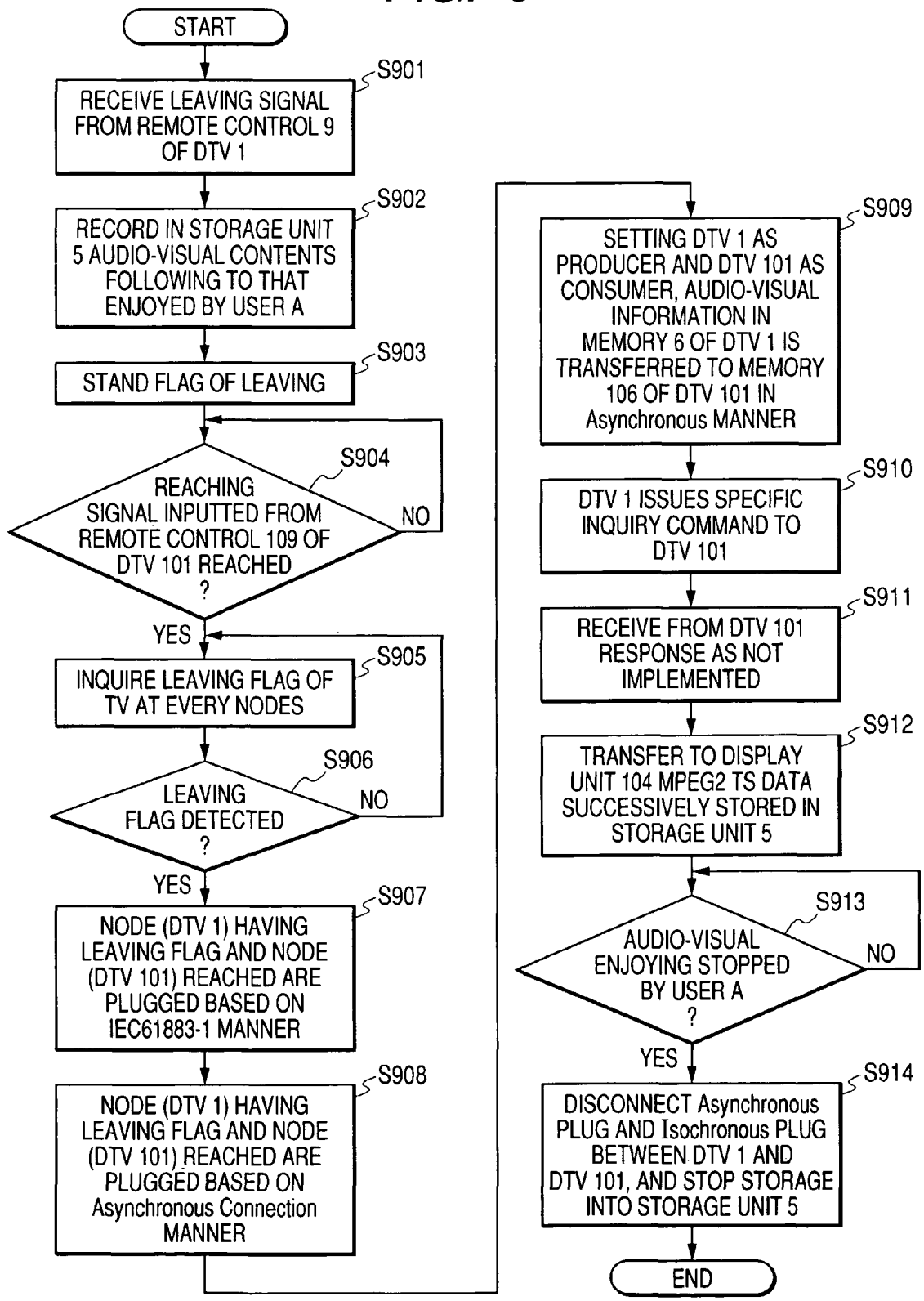
FIG. 9 is a flowchart to explain about a second control system of the network TV system in the present embodiment.

FIG. 9 is a flowchart to explain about a second control method of the network TV system in the present embodiment. In the second control method, a control method in case of the user having left without any storage unit existing in the reaching destination will be described.

FIG. 1 is a view to show a state where a user A is enjoying the TV by the digital TV1, and this user A allows the display unit 4 to select and display a desired image data, audio data and the like from the MPEG2_TS data to be received by the tuner 2. At this time, the audio-visual information is stored in the memory 6.

Figure 10:
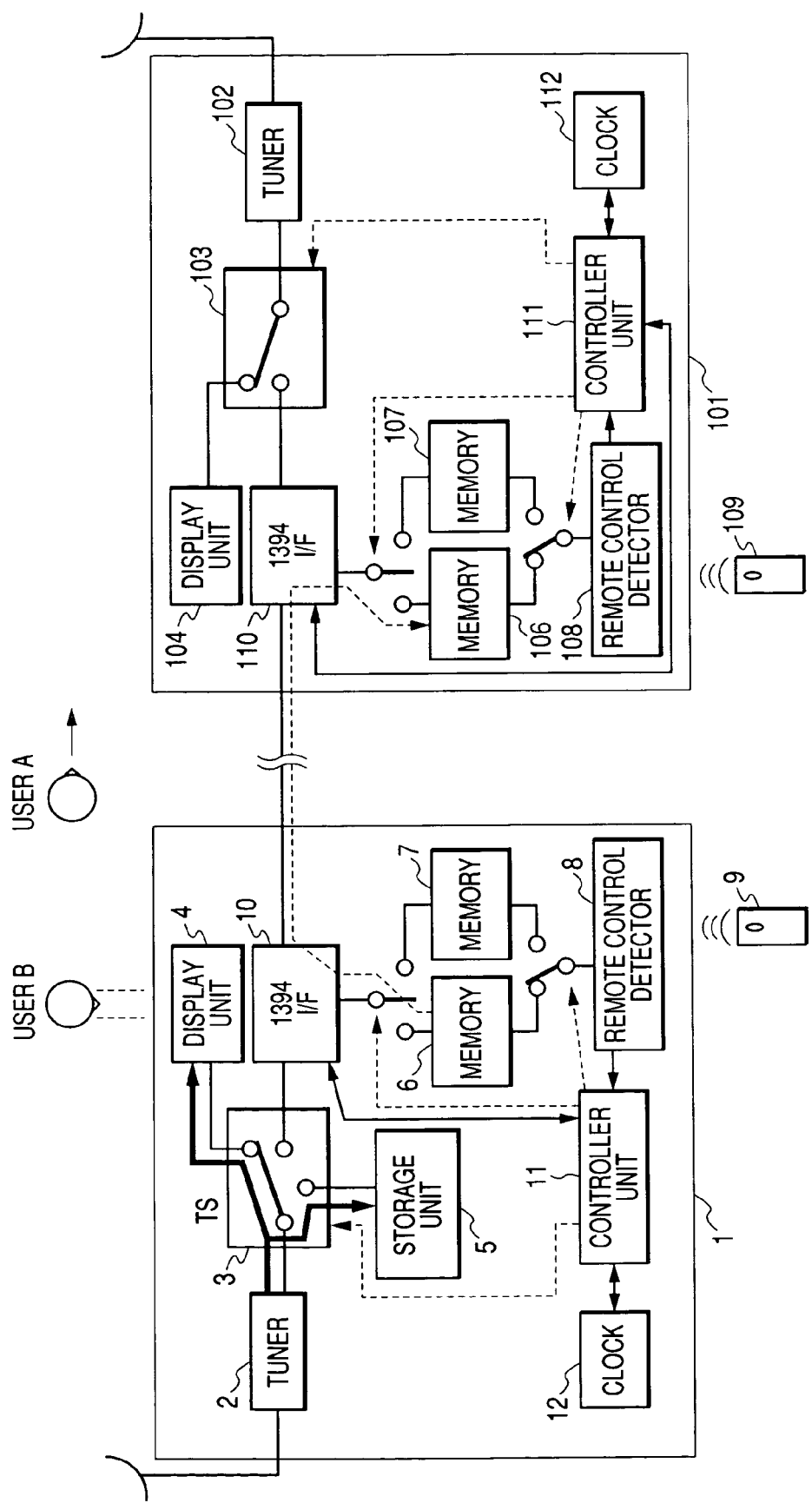
FIG. 10 is a schematic block diagram to explain about the operation of the network TV system in the second control system.

First, when the user A has to leave for some reasons, the user A notifies the digital TV1 of leaving information through the remote controller 9 (step S901). Subsequently, in the control unit 11, when the leaving information (no reaching destination determined) is received from the remote controller detection unit 8, as shown in FIG. 10, the selector switch unit 3 is operated to be connected to the storage unit 5 side so that the sequence of the audio-visual contents enjoyed by the user A is stored in the storage unit 5 (step S902). Here, the MPEG2_TS is stored in the storage unit 5 as described above, and at the same time, another user B selects a desired audio-visual data and allows it to be displayed on the display unit 4 to be enjoyed.

Further, the switch for storing the audio-visual information is changed over to the side of the memory 7. The user B is allowed to receive the support of a channel selection based on new audio-visual information. At this time, the audio-visual information for the user B may be downloaded from another AV device through the 1394I/F unit 10 or the audio-visual information for the user A stored in the memory 6 may be copied in the memory 7 and used. Subsequently, in the interior of the control unit 11, a flag to show the leaving origin is stood up (step S903). This flag can be read by a status command inputted through the 1394I/F unit 10. The operational state in this case is shown in FIG. 10.

Subsequently, the user A decides a reaching destination, and it is determined whether or not a reaching signal input from the remote controller 109 of the reached digital TV 101 is available (step S904). This determination is performed by the control unit 111, and as a result of this determination, when it is determined that the reaching signal input from the remote controller 109 of the reached digital TV 101 is available, the procedure advances to step S905. On the other hand, as a result of the determination of step S904, when it is determined that the reaching signal input from the remote controller 109 of the digital reached TV101 is not available, a standby is effected at step S904 until the reaching signal input becomes available.

Subsequently, in a control unit 111 of the reached digital TV101, in order to search for the left source, the leaving flag transfers a status command, which comes back as a response, to all the nodes on the IEEE1394 network in order or in broadcast by the Asynchronous transfer of the IEEE1394 (step S905).

Subsequently, in the control unit 111, it is determined whether or not the leaving flag is found (step S906). As a result of this determination, when the left flag is found, the procedure advances to step S907. On the other hand, as a result of the determination of step S906, when the left flag is not found, the procedure returns to step S905.

Subsequently, an Isochronous plug is plugged based on the IEC61883-1 specification for the returned node (digital TV1) wherein the left flag returns within response information for the status command (step S907). Subsequently, an Asynchronous plug is plugged for the node (digital TV1) having the left flag based on an Asynchronous Connection specification set up by the 1394TA (step S908). This allows, in the present embodiment, both of the plugs to be plugged by the node between the digital TV1 and the digital TV101.

Subsequently, by using an Asynchronous Connection control unit 401 in the interior of the 1394I/F unit 10 shown in FIG. 4, the reaching audio-visual information of the memory 6 is transferred to a memory 106 in the interior of the digital TV101 (step S909).

Subsequently, when it is not clear whether or not a command capable of controlling the storage unit 105 should be accepted by the digital TV101, a SPECIFIC_INQUIRY command is issued from the digital TV1 to the digital TV101 through the IEEE1394 (step S910), and it is determined whether or not a control command to activate the storage unit 105 in the digital TV101 is effective. In the present embodiment, since there exists no storage unit in the interior of the digital TV101, the digital TV1 receives a response of [NOT_IMPLEMENTED] from the digital TV101 (step S911).

Figure 11:
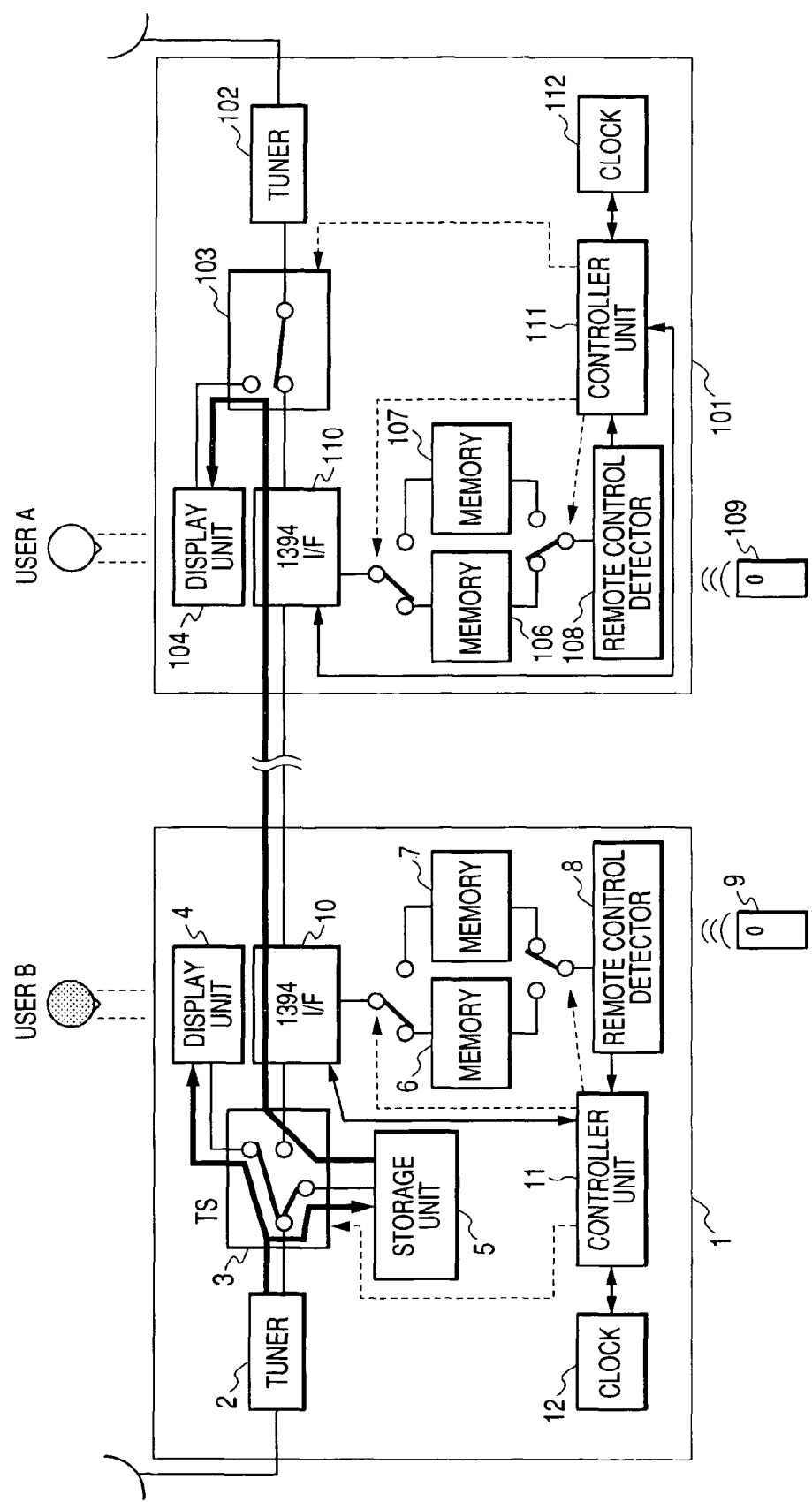
FIG. 11 is a schematic block diagram to explain about the operation of the network TV system in the second control system.

Subsequently, by using the Isdochronous plug (based on the IEC61883-1 specification) connecting between the digital TV1 and the digital TV101 with the storage of the MPEG2_TS data from the tuner 2 to the storage unit 5 continued, the MPEG2_TS data stored in the storage unit 5 is transferred to the display unit 104 in order (step S912). The operational state in this case is shown in FIG. 11.

Subsequently, it is determined whether or not the user A stops the audio-visual enjoyment (step S913). As a result of this determination, when it is determined that the user A stops the audio-visual enjoyment, the procedure advances to step S914. On the other hand, as a result of the determination of step S913, when it is determined that the user A does not stop the audio-visual enjoyment, a standby is effected at step S913 until it is determined that the user A stops the audio-visual enjoyment.

Subsequently, when it is determined that the user A stops the audio-visual enjoyment, the storage to the storage unit 5 is stopped, and the plug plugged between the digital TV1 and the digital TV101 is also disconnected (step S914).

(3) In the case of the user has left with the reaching destination determined.

Figure 12:
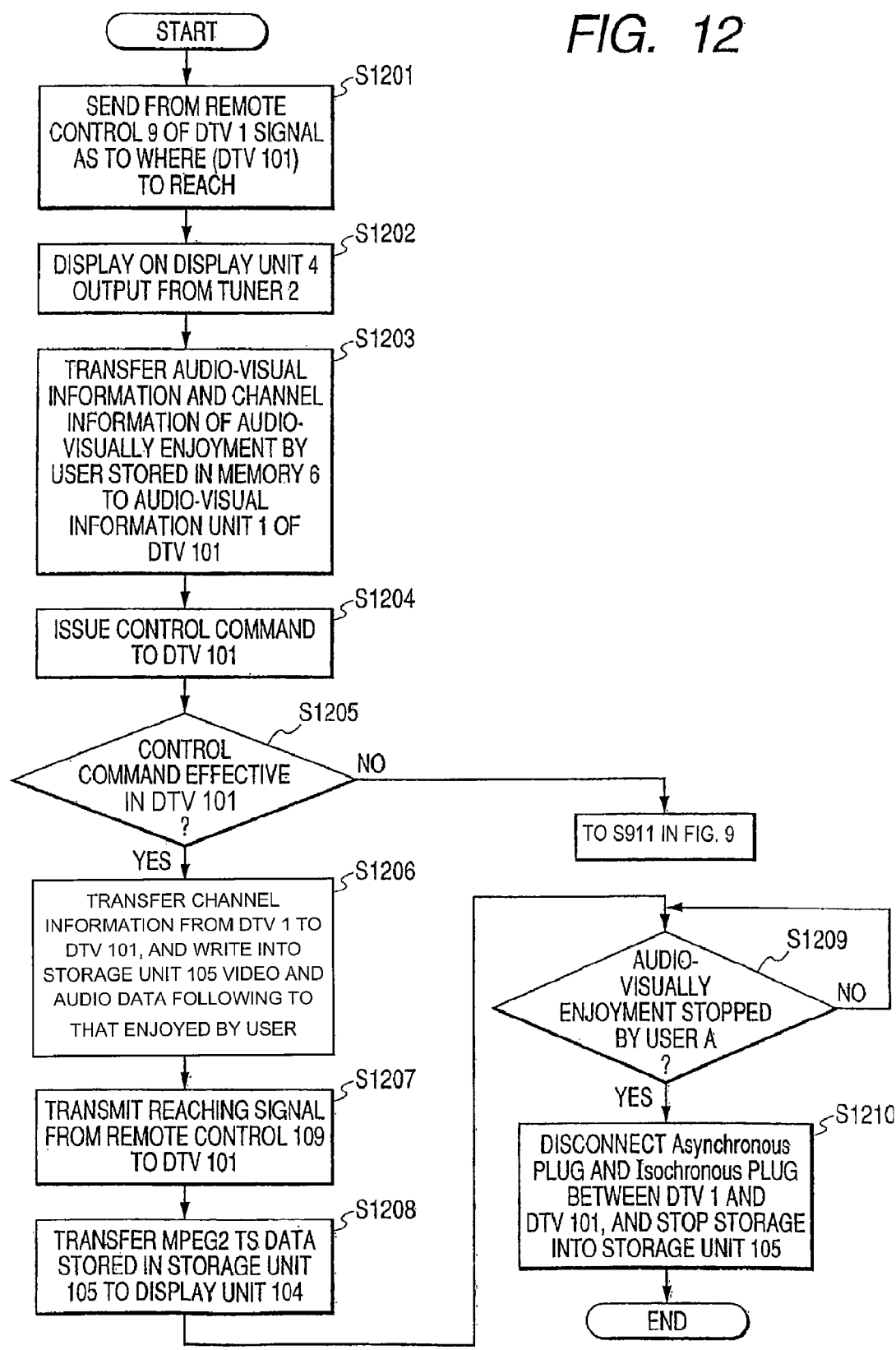
FIG. 12 is a flowchart to explain about a third control system of the network TV system in the present embodiment.

FIG. 12 is a flowchart to explain about a third control method of the network TV system in the present embodiment. In the third control method, a control method in case of the user having left with a reaching destination determined will be described.

Figure 13:
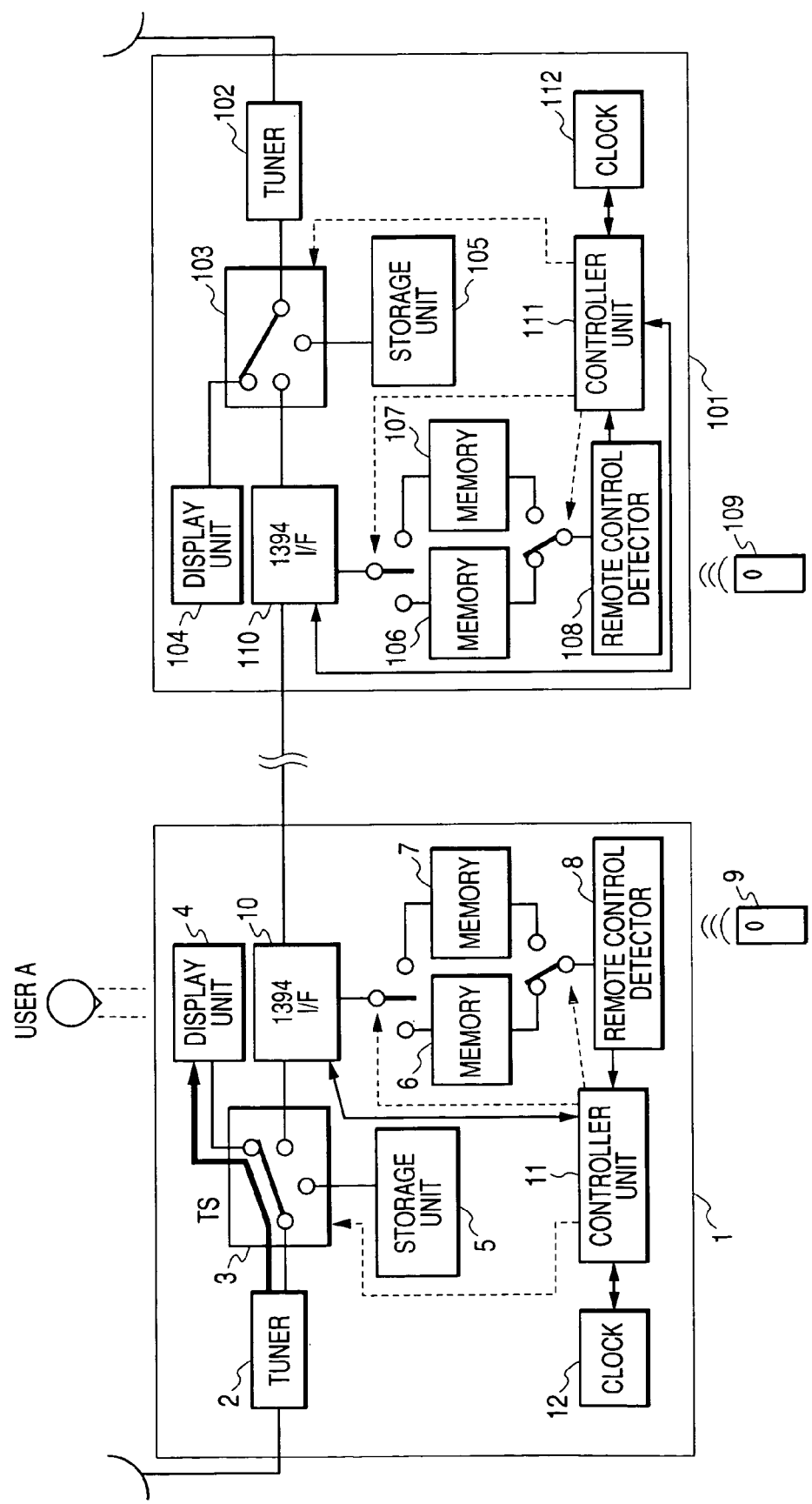
FIG. 13 is a schematic block diagram to explain about the operation of the network TV system in the third control system.

FIG. 13 is a view to show a state where a user A is enjoying the audio-visual contents by the digital TV1, and this user A allows the display unit 4 to select and display a desired image data, audio data and the like from the MPEG2_TS data to be received by the tuner 2. At this time, the audio-visual information is stored in the memory 6.

First, when the user A has to leave for some reasons, since the leaving destination of the user A is known in advance, the user A notifies the digital TV1 of reaching information (node of the digital TV101) through the remote controller 9 (step S1201). Subsequently, in the control unit 11, when the leaving information is received from the remote controller detection unit 8, as shown in FIG. 13, the output from the tuner 2 is inputted into the display unit 4 while the selector-switch unit 3 remains as it is, and the audio-visual data desired by another user B is displayed on the display unit 4 to be enjoyed (step S1202).

Further, the switch for storing the audio-visual information is changed over to the side of the memory 7. The user B is allowed to receive the support of a channel selection based on new audio-visual information. At this time, the audio-visual information for the user. B may be downloaded from another AV device through the 1394I/F unit 10 or the audio-visual information for the user A stored in the memory 6 may be copied in the memory 7 and used.

Subsequently, by using an Asynchronous Connection control unit 401 in the interior of the 1394I/F unit 10 shown in FIG. 4, the reaching audio-visual information of the memory 6 and the channel information enjoyed by the user A are transferred to a memory 106 in the interior of the digital TV101 (step S1203).

On the other hand, since the sequence of the audio-visual contents enjoyed by the user A is known in advance from the reaching destination, the storage unit 105 of the reaching destination is used. In general, when the data is transferred by the IEEE1394, the longer the transfer distance is, the slower the transfer speed is. Further, since there is an upper limit on the data transfer amount on the IEEE1394 network, it is desirable that the transfer amount is small.

Subsequently, the digital TV1 issues a control command to the digital TV101 through the IEEE1394 in order to activate the storage unit 105 of the digital TV101 (step S1204). This control command conforms to the FCP command frame regulated by the IEC61883-1.

Subsequently, when it is not clear whether or not a command capable of controlling the storage unit 105 should be accepted by the digital TV101, a SPECIFIC_INQUIRY command is issued from the digital TV1 to the digital TV101 through the IEEE1394, and it is determined whether or not a control command to activate the storage unit 105 in the digital TV101 is effective (step S1205). As a result of this determination, a response of [IMPLEMENTED] from the digital TV101 is received, and when it is determined that the control command is effective, the procedure advances to step S1206. On the other hand, as a result of the determination of step S1205, a response of [NOT_IMPLEMENTED] is received from the digital TV101, and when it is determined that the control command is not effective, the procedure advances to a processing of step S911 of FIG. 9.

Figure 14:
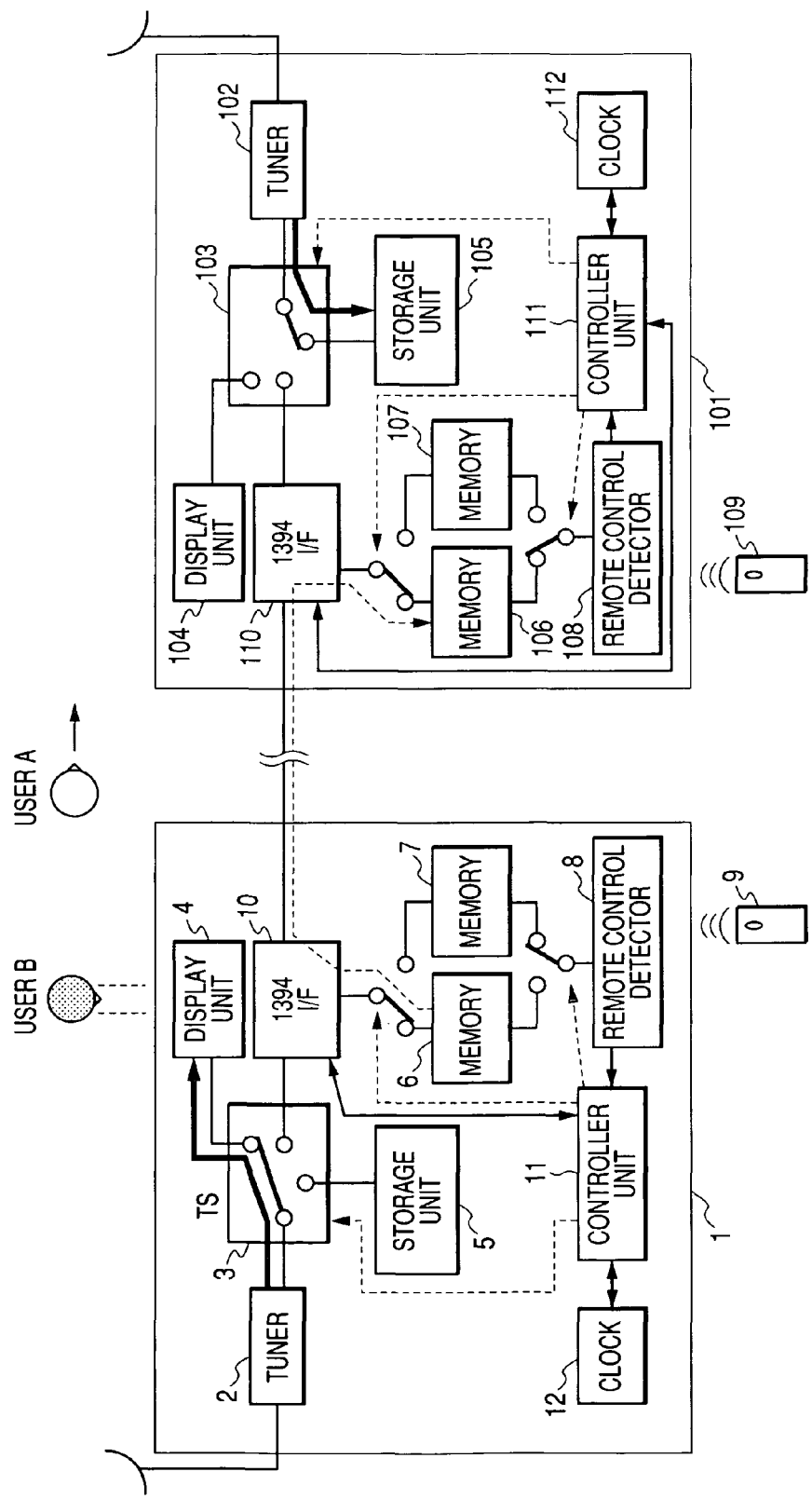
FIG. 14 is a schematic block diagram to explain about the operation of the network TV system in the third control system.

When a response of [IMPLEMENTED] is received from the digital TV101 and it is determined that the control command is effective, subsequently, the channel information is transmitted to the tuner 102 of the digital TV101 from the digital TV1, and the continued video and audio data enjoyed by the user A is written in the storage unit 105 (step S1206). The operational state in this case is shown in FIG. 14.

Figure 15:
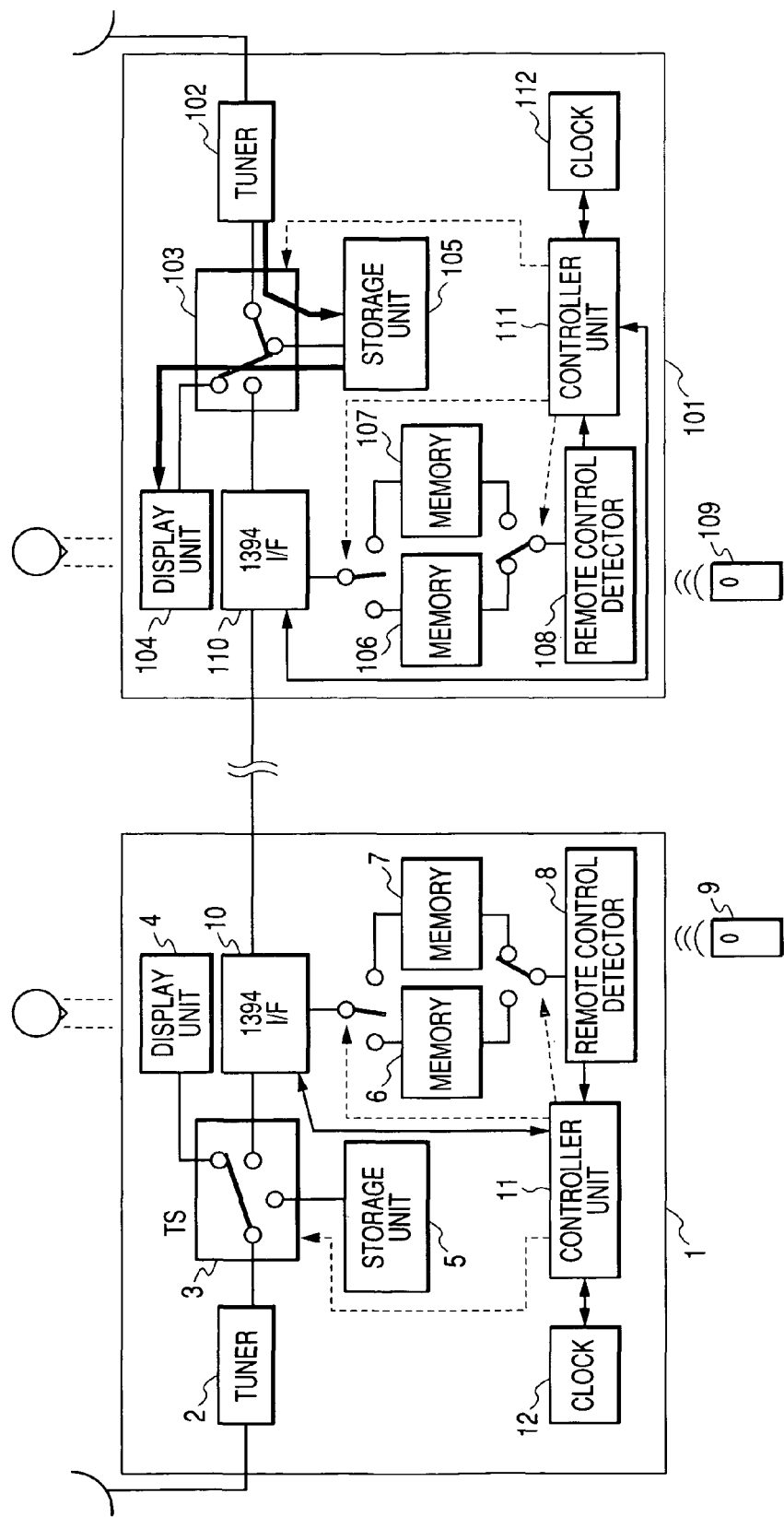
FIG. 15 is a schematic block diagram to explain about the operation of the network TV system in the third control system.

Subsequently, a reaching signal is transmitted to the digital TV101 by using the remote controller 109 in order to notify that the user A arrives at the reaching destination (step S1207). Subsequently, the MPEG2_TS data stored in the storage unit 105 is transferred to the display unit 104 (step S1208). At this time, the writing (storage) of the MPEG2_TS data performed for the storage unit 105 is allowed to continue. The operational state in this case is shown in FIG. 15.

Subsequently, it is determined whether or not the user A stops the audio-visual enjoyment (step S1209). As a result of this determination, when it is determined that the user A stops the audio-visual enjoyment, the procedure advances to step S1210. On the other hand, as a result of the determination of step S1209, when it is determined that the user A does not stop the audio-visual enjoyment, a standby is effected at step S1209 until the user A stops the audio-visual enjoyment.

Subsequently, when it is determined that the user A stops the audio-visual enjoyment, the storage to the storage unit 105 is stopped, and the plug plugged between the digital TV1 and the digital TV101 is disconnected.

Each means configuring the network TV system by the above-described embodiment and each step (step S501 to step S520 of FIG. 5, step S901 to step S914 of FIG. 9 and step S1201 to step S1210 of FIG. 12) of the control method of the network TV system can be realized by operating the program stored in the RAM, ROM and the like of the computer. This program and the storage medium capable of reading the computer recorded with the program are included in the present invention.

To be more precise, the program is recorded in the recording medium, for example, such as a CD-ROM, or supplied to the computer through various transmission media. As the storage medium for storing the above-described program, in addition to CD-ROM, a flexible disc, a hard disc, a magnetic tape, a magneto-optic disc, a non-volatile memory card, and the like can be used. On the other hand, as the transmission media of the above-described program, a communication media (wire circuit and radio circuit such as an optical fiber and the like) in a computer network (LAN, WAN such as Internet and the like, Radio communication network and the like) for propagating and supplying the program information as a carrier wave can be used.

Further, by executing the supplied program by the computer, not only the above-described functions of the embodiment are realized, but also such programs are included in the present invention where the above described functions of the embodiment are realized by the corroboration with the OS (operating system) by which the program is activated in the computer and other applications and the like, or where the whole or a part of the processing of the supplied program is performed by the feature expansion board or the feature expansion unit of the computer, thereby realizing the above described functions of the embodiment.

This application claims priority from Japanese Patent Application No. 2003-342513 filed Sep. 30, 2003, which is hereby incorporated by reference herein.

What is claimed is:

1. A TV apparatus having a tuner for receiving image data, a storage unit for storing received image data, and a display unit for displaying the image data, said TV apparatus comprising:
   a leaving information receiving unit for receiving leaving information via the user's operation of said TV apparatus to discriminate movement of a user from said TV apparatus to another identified TV apparatus with interruption of the user's viewing audio-visual contents, caused by the user's movement, wherein the another TV apparatus has a display unit for displaying image data;
   a channel information storage unit for storing channel information regarding a channel currently selected by the user;
   a transmitting unit for transmitting the channel information stored in the channel information storage unit to the another TV apparatus if the leaving information receiving unit receives the leaving information input by the user;
   a determining unit for determining whether the another TV apparatus has a storage unit therein; and
   a controller unit for, if the determining unit determines that the another TV apparatus has a storage unit therein when the leaving information receiving unit receives the leaving information input by the user, controlling a tuner and the storage unit of the another TV apparatus such that a channel of the tuner is selected according to the channel information and storage is started into the storage unit of the another TV apparatus of the image data received on the selected channel by the tuner so as to display the stored image data on the display unit of the another TV apparatus when the stored image data is reproduced from the storage unit of the another TV apparatus, and if the determining unit determines that the another TV apparatus does not have a storage unit therein when the leaving information receiving unit receives the leaving information input by the user, controlling the storage unit and the transmitting unit of the TV apparatus to store image data received on the selected channel by the tuner of the TV apparatus in the storage unit thereof and transmit the image data stored in the storage unit to the another TV apparatus for display on the display unit of the another TV apparatus.

2. The TV apparatus according to claim 1, wherein the channel information storage unit comprises (a) a plurality of memory units and (b) a change-over unit, controlled by the controller unit, for changing over selection of one of the memory units for storing the channel information, in response to reception of the leaving information.

3. An apparatus according to claim 1, wherein the determining unit issues a control command for activating the storage unit of the another TV apparatus, to the another TV apparatus, and determines whether the another TV apparatus has the storage unit therein on the basis of a response from the another TV apparatus which indicates whether the control command is effective or not.

4. A control method of a TV apparatus having a tuner for receiving image data, a storage unit for storing received image data, and a display unit for displaying the image data, said control method comprising:
   receiving leaving information via the user's operation of the TV apparatus to discriminate movement of a user from the TV apparatus to another identified TV apparatus with interruption of the user's viewing audio-visual contents, caused by the user's movement, wherein the another TV apparatus has a display unit for displaying image data;
   storing channel information regarding a channel currently selected by the user;
   transmitting the channel information stored in the storing step to the another TV apparatus in response to if the leaving information receiving step receives the leaving information input by the user;
   determining whether the another TV apparatus has a storage unit therein; and
   if the determining step determines that the another TV apparatus has a storage unit therein when the leaving information receiving step receives the leaving information input by the user, controlling the tuner and a storage unit of the another TV apparatus such that a channel of the tuner is selected according to the channel information and storage is started into the storage unit of the another TV apparatus of the image data received on the selected channel by the tuner so as to display the stored image data on the display unit of the another TV apparatus when the stored image data is reproduced from the storage unit of the another TV apparatus, and if the determining step determines that the another TV apparatus does not have a storage unit therein when the leaving information receiving step receives the leaving information input by the user, controlling the storage unit of the TV apparatus and the transmitting step to store image data received on the selected channel by the tuner of the TV apparatus in the storage unit thereof and transmit the image data stored in the storage unit to the another TV apparatus for display on the display unit of the another TV apparatus.

5. The control method according to claim 4, wherein the channel information storage unit comprises (a) a plurality of memory units and (b) a change-over unit, controlled in the controlling step, for changing over selection of one of the memory units for storing the channel information, in response to reception of the leaving information.

6. The control method according to claim 4, wherein the determining step includes issuing a control command for activating the storage unit of the another TV apparatus, to the another TV apparatus, and determining whether the another TV apparatus has the storage unit therein on the basis of a response from the another TV apparatus which indicates whether the control command is effective or not.

* * * * *